United States Patent
Yin et al.

(10) Patent No.: US 11,131,784 B2
(45) Date of Patent: Sep. 28, 2021

(54) MULTI-POINT GEOSTATISTICAL PRESTACK INVERSION METHOD BASED ON RENEWAL PROBABILITY RATIO CONSTANT THEORY

(71) Applicant: Yangtze University, Wuhan (CN)

(72) Inventors: Yanshu Yin, Wuhan (CN); Xun Hu, Wuhan (CN); Wenjie Feng, Wuhan (CN); Changmin Zhang, Wuhan (CN)

(*) Notice: Subject to any disclaimer, the term of this patent is extended or adjusted under 35 U.S.C. 154(b) by 0 days.

(21) Appl. No.: 17/315,503

(22) Filed: May 10, 2021

(65) Prior Publication Data

US 2021/0263176 A1    Aug. 26, 2021

Related U.S. Application Data

(63) Continuation of application No. PCT/CN2020/134088, filed on Apr. 12, 2020.

(30) Foreign Application Priority Data

Jan. 21, 2020    (CN) .......................... 202010068937.8

(51) Int. Cl.
*G01V 1/30* (2006.01)
*E21B 47/002* (2012.01)
*G01V 1/28* (2006.01)

(52) U.S. Cl.
CPC ............ *G01V 1/30* (2013.01); *E21B 47/0025* (2020.05); *G01V 1/282* (2013.01); *E21B 2200/20* (2020.05)

(58) Field of Classification Search
CPC .......... G01V 1/306; G01V 1/28; G01V 1/307; G01V 1/282; G01V 1/50; G01V 1/30; G01V 1/48; G01V 99/005; G01N 33/24
See application file for complete search history.

(56) References Cited

U.S. PATENT DOCUMENTS

| 7,254,091 B1 | 8/2007 | Gunning et al. |
| 2011/0108283 A1* | 5/2011 | Srnka ..................... G01V 11/00 166/369 |
| 2015/0301223 A1* | 10/2015 | Xu .......................... G01V 1/50 703/2 |

FOREIGN PATENT DOCUMENTS

| CN | 104850682 A | 8/2015 |
| CN | 108645994 A | 10/2018 |

(Continued)

OTHER PUBLICATIONS

First Office Action dated Oct. 29, 2020 for OEE priority app. No. CN202010068937.8 with English translation.

(Continued)

*Primary Examiner* — Mischita L Henson
(74) *Attorney, Agent, or Firm* — KandareIP, LLC

(57) ABSTRACT

A multi-point geostatistical prestack inversion method based on a renewal probability ratio constant theory, comprising the following steps: sorting information, work area gridding and distributing well data, assigning an initial attribute value to a simulation work area, selecting a data template with an appropriate size, inversion and judging iteration termination; the method overcomes the defects that in the prior art, oil and gas exploration and development are more and more difficult, exploration degree is higher and higher, new oil and gas reservoirs are more and more difficult to find, reservoir parameters are inaccurate, and exploration uncertainty is increased, and the method has the advantages that prior information is obtained through a multi-point geostatistics method and then screening is carried out through a minimum objective function such that the complexity of seismic inversion is reduced.

8 Claims, 25 Drawing Sheets

(56) References Cited

FOREIGN PATENT DOCUMENTS

| | | |
|---|---|---|
| CN | 108931811 A | 12/2018 |
| CN | 110031895 A | 7/2019 |
| WO | 2012015542 A1 | 2/2012 |

OTHER PUBLICATIONS

Notification of Grant Patent Right for Invention, dated Dec. 8, 2020, for OEE priority app. No. CN202010068937.8 (with English translation).
Publication of Chinese Patent No. CN111273348B dated Feb. 5, 2021 granted from OEE priority app. No. CN202010068937.8 with English translation of issued claims.

* cited by examiner

FIG. 8

| 0 | 0 | 0 | 0 | 0 |
|---|---|---|---|---|
| 0 | 0 | 0 | 0 | 0 |
| 1 | 1 | 1 | 1 | 1 |
| 1 | 1 | 1 | 1 | 1 |
| 1 | 1 | 1 | 1 | 1 |

FIG. 9

| | 5.46 | 5.86 | 0.35 | 0.60 |
|---|---|---|---|---|
| | 5.32 | 5.56 | 0.87 | 0.63 |
| | 5.03 | 5.99 | 0.98 | 0.61 |
| | 5.90 | 5.12 | 0.85 | 0.87 |
| | 5.87 | 5.22 | 0.36 | 0.62 |

FIG. 10

MULTI-POINT GEOSTATISTICAL PRESTACK INVERSION METHOD BASED ON RENEWAL PROBABILITY RATIO CONSTANT THEORY

CROSS-REFERENCE TO RELATED APPLICATIONS

This application is a U.S. Continuation of International Patent Application No. PCT/CN2020/134088 filed Apr. 12, 2020, which claims priority to Chinese patent application No. 202010068937.8, filed on Jan. 21, 2020, the entire contents of each of which are incorporated herein by reference.

TECHNICAL FIELD

The disclosure relates to the technical field of oil and gas exploration and development, in particular to a multi-point geostatistical prestack inversion method based on a renewal probability ratio constant theory.

BACKGROUND

At present, oil and gas exploration and development are becoming more and more difficult, the degree of exploration is getting higher and higher, and it is more and more difficult to find new oil and gas pools. This requires accurate reservoir parameters to reduce the uncertainty of the exploration.

Seismic stochastic inversion is the fusion of logging data under the constraint of seismic data, which can broaden the frequency spectrum of inversion results, improve the resolution, and facilitate the search for a thinner and smaller reservoir. Hass and Dubrule (1994) first proposed a rudiment of stochastic inversion, combining sequential Gaussian stimulation method with seismic inversion. Xingyao Yin etc. (2005) applied Bayesian theory to the inversion and obtained good results. In 2010, Yuecheng Sun applied the stochastic inversion method to prestack inversion. In 2011, Jiahua Wang studied the multi-point statistical method of seismic data. He took well data as hard data and seismic data as constraints to constrain the stochastic simulation process, reducing the uncertainty between wells. Yanshu Yin summarized the application of the multi-point geostatistics method in 2011.

The seismic stochastic inversion method has become mature in the past twenty years, but there are still many defects, such as low computational efficiency, poor lateral continuity, and so on. Therefore, more in-depth research on the stochastic inversion method is needed continually to better predict the reservoir and improve the accuracy of exploration and development.

Therefore, there is an urgent need for a method of predicting a reservoir and improving the accuracy of exploration and development.

SUMMARY

It is an object of the present disclosure to overcome the above-described deficiencies of the background art and to provide a multi-point geostatistical prestack inversion method based on a renewal probability ratio constant theory.

The purpose of this present disclosure is to be implemented through the following technical solution: a multi-point geostatistical prestack inversion method based on a renewal probability ratio constant theory, comprising the following specific steps:

① sorting out information checking whether original seismic information and well information is complete, with the seismic information being prestack seismic data, and the well information comprising drilling core and logging data; according to well information interpretation result, it being possible that lithofacies corresponding to different well depths and elastic parameters of different lithofacies can be determined, with the elastic parameter comprising density, longitudinal wave velocity, and shear wave velocity; establishing facies proportions of different lithofacies according to lithofacies data, and establishing cumulative distribution functions of elastic parameters of different lithofacies according to elastic parameter data; and establishing a training image conforming to reservoir characteristics of a work area;

② work area gridding and distributing well data selecting an appropriate grid size according to an actual work area range, performing grid division on the work area, and establishing a grid model; gridding core data and logging data according to a plane position and the well depth of each well; and with the core data being lithofacies, the logging data being interpreted density, longitudinal wave velocity, and shear wave velocity;

distributing the core data and the logging data as hard data to a divided nearest neighbor grid node;

the information contained in actual drilling within a work area being called hard data or condition data, with the hard data comprising lithofacies, density, longitudinal wave data, and shear wave velocity; a grid distributed with the hard data of the lithofacies being called a known grid or a known point; a grid without lithofacies data being called to-be-evaluated grid or also called to-be-evaluated point;

after work area gridding and distributing well data, the distributing well data being drilling data and logging data;

the known grid being a grid distributed with lithofacies data;

the known grid being a grid through which drilling passes, and the to-be-evaluated grid being a grid through which no drilling passes; the known grid of the work area containing lithofacies, density, longitudinal wave velocity, and shear wave velocity, and the to-be-evaluated grid not having any data;

③ assigning an initial attribute value to a simulation work area according to a statistical cumulative distribution function of a rock elastic parameter of the work area, an initial attribute value being assigned to a to-be-evaluated point of the work area, wherein the initial attribute value refers to elastic parameter;

④ selecting a data template with an appropriate size determining a shape and size of a data template according to morphological characteristics of sedimentary facies; it being possible that the shape of the data template can be determined according to heterogeneity of the sedimentary facies, it being possible that a two-dimensional ellipse or a three-dimensional ellipsoid can be adopted when the heterogeneity is strong, and it being possible that a two-dimensional rectangle or a three-dimensional cuboid can be adopted when the heterogeneity is weak; the size of the data template adopting a size of 5×7 or 5×5×7;

⑤ inversion wherein the inversion is obtained by the following three sub-steps:

sub-step 5.1: ordered access of simulation nodes;

wherein firstly, pseudo-random numbers are randomly generated for all grids in the work area with numerical values of the random numbers being between 0 and 1, and then the size of a data template of the to-be-evaluated grid is taken to search the number of condition points around; the numerical value of each to-be-evaluated point is equal to a sum of the pseudo-random number and the number of condition points, all to-be-evaluated points are sorted from large to small, and a grid with a large value is simulated in priority to obtain a simulation path of an entire work area;

sub-step 5.2: suggested data pattern obtainment;

wherein if primary inversion is carried out and the to-be-evaluated grid is processed, firstly the number of condition points, a position relative to the to-be-evaluated point and a lithofacies type in a data template range with the to-be-evaluated point as the center are determined to form a data event presented in a vector form with the to-be-evaluated point as the center; the data event is utilized to randomly scan a training image established in step ① to obtain a first completely matched data pattern therefrom as a suggested data pattern; the suggested data pattern represents a sedimentary mode, which is a lithofacies data structure with the size of the data template and where the lithofacies data structure of the condition points in the data template can be fully embodied in the suggested data pattern;

if iterative inversion is carried out and the to-be-evaluated grid is processed, firstly, the data event is formed according to the to-be-evaluated point and a condition point of a data template range of the to-be-evaluated point, and the training image established in step ① is scanned randomly through the data event to obtain a plurality of completely matched data patterns from the training images as candidate data patterns; the candidate data patterns are sorted according to the lithofacies type of a central point to make cumulative probability distribution;

the candidate data pattern can contain up to a first 50 data patterns scanned from first-to-last training images, and when less than 50 candidate data patterns, all the data patterns of the training images scanned with the data event are used as candidate data patterns, and proportions of different lithofacies are calculated according to differences of central lithofacies of the candidate data patterns and denoted as $a_{x1}:a_{x2}: \ldots :a_{xm}$ and a probability of elastic parameters of different facies is calculated according to a last elastic parameter according to the following formula:

$$b = \frac{1}{(8\pi^3 \sigma_{\rho_i} \cdot \sigma_{V_{P_i}} \cdot \sigma_{V_{S_i}})^{\frac{n}{2}}} \cdot \exp\left[\sum_{i=1}^{n} \left(\frac{(\rho_i - \mu_\rho)^2}{2\sigma_{\rho_i}^2} + \frac{(V_{p_i} - \mu_{V_P})^2}{2\sigma_{V_{P_i}}^2} + \frac{(V_{S_i} - \mu_{V_S})^2}{2\sigma_{V_{S_i}}^2}\right)\right]$$

in the formula, b represents the probability of the lithofacies elastic parameter, n represents the number of grids in the range of the data template of the to-be-evaluated point, $\rho_i$ represents a density value of the $i^{th}$ grid in the range of the data template surrounding the to-be-evaluated point, $V_{p_i}$ represents the longitudinal wave velocity of the $i^{th}$ grid in the range of the data template surrounding the to-be-evaluated point, $V_{S_i}$ represents the shear wave velocity of the $i^{th}$ grid in the range of the data template surrounding the to-be-evaluated point, $\mu_\rho$ represents a mean value of the lithofacies density, $\mu_{V_P}$ represents the mean value of the lithofacies longitudinal wave velocity, $\mu_{V_S}$ represents the mean value of the lithofacies shear wave velocity, $\sigma_{\rho_i}$ represents a variance of the lithofacies density, $\sigma_{V_{P_s}}$ represents the variance of the lithofacies longitudinal wave velocity, and $\sigma_{V_{S_i}}$ represents the variance of the lithofacies shear wave velocity;

the proportion of elastic parameters of different lithofacies is denoted as: $b_{x1}:b_{x2}: \ldots : b_{xm}$;

finally, a joint probability of different facies is calculated with $(a_{x1} \cdot b_{x1}):(a_{x2} \cdot b_{x2}): \ldots : (a_{xm} \cdot b_{xm})$, and denoted as $P_{x1}: P_{x2}: \ldots : P_{xm}$; the joint probability is normalized to obtain $P'_{x1}: P'_{x2}: \ldots : P'_{xm}$, and the joint probability of different lithofacies is made into a cumulative distribution function;

then the candidate data patterns are sorted according to the lithofacies of a central grid, followed by randomly sampling to obtain a random number between 0 and 1, and the suggested data pattern is determined according to the position of a cumulative distribution function formed by the random number in the joint probability and the cumulative probability distribution of the candidate modes;

sub-step 5.3: suggested elastic parameter obtainment;

wherein according to the cumulative distribution function of the elastic parameters of different rock facies counted in step ①, the elastic parameters of the rock facies at each position are sampled in the suggested data pattern; the elastic parameter comprises a density value, a longitudinal wave velocity value and a shear wave velocity value;

sub-step 5.4: a synthetic record of a suggested elastic parameter in the suggested data pattern is calculated;

wherein a reflection coefficient is calculated based on the following Connolly formula by using the suggested elastic parameter and a preset incident angle;

$$EI(m,\theta) = V_P^{(1+\tan^2\theta)} \cdot V_S^{(-8K\sin^2\theta)} \cdot \rho^{(1-4K\sin^2\theta)}$$

in the formula, $$K = \frac{V_s^2}{V_p^2},$$

$EI(m, \theta)$ represents the reflection coefficient when the incident angle is $\theta$, $\theta$ represents the preset incident angle, m represents the elastic parameters, comprising $V_p$, $V_s$ and $\rho$, $V_p$ represents the longitudinal wave velocity, $V_s$ represents the shear wave velocity, and $\beta$ represents density;

based on the reflection coefficient and seismic ground wave, initial forward modeling is calculated by adopting the following convolution formula:

$$g(m) = w(\theta) * EI(m, \theta)$$

in the formula, g(m) represents initial forward modeling, m represents the elastic parameter, and $w(\theta)$ represents a seismic wavelet when the preset incident angle is $\theta$; and sub-step 5.5: selecting the elastic parameter with a highest matching rate with an original prestack data;

wherein the synthetic record of the last elastic parameter and the suggested elastic parameter are calculated respectively by sub-step 5.3 and sub-step 5.4, and the former is denoted as $g(m_l)$, and the latter is denoted as $g(m_s)$; moreover, the original prestack elastic parameter is denoted as $g_o$; herein the last elastic parameter can be an initial elastic parameter or a suggested elastic parameter in a previous iteration process;

a plurality of synthetic seismic traces is compared with an actual seismic record by adopting the following formula, and a stratum model parameter with a minimum objective function and the corresponding suggested data pattern are selected as an optimal inversion result:

$$m = \begin{cases} m_l, & |g(m_l) - g_o| < |g(m_s) - g_o| \\ m_s, & |g(m_l) - g_o| \geq |g(m_s) - g_o| \end{cases}$$

in the formula, m represents a selected elastic parameter, $m_l$ represents the last elastic parameter, and $m_s$ represents the suggested elastic parameter in the suggested data model; and ⑥ outputting a simulation result after the iteration is judged to be terminated herein sub-step 5.1 to sub-step 5.5 being repeated until all grids are traversed, that is, simulation at all to-be-evaluated points being completed is that one-time inversion realization is achieved;

when iterative inversion times are less than 7, step ⑤ being repeated and next iterative inversion being carried out; when the iterative inversion is completed at the seventh time, a whole inversion process being completed, a multi-point geostatistical seismic inversion model being obtained, and a simulation result being output.

Further, the multi-point geostatistical prestack inversion method based on a renewal probability ratio constant theory, wherein in step ② when there are multiple well data in one grid, a data point closest to a center of the grid is selected as hard data.

Further, the multi-point geostatistical prestack inversion method based on a renewal probability ratio constant theory, wherein in sub-step 5.1 an order of accessing simulation nodes is usually from rich well information area gradually to less rich well information area, and finally to no well area.

Further, the multi-point geostatistical prestack inversion method based on a renewal probability ratio constant theory, wherein in sub-step 5.2 rock facies condition data includes well condition data and sedimentary facies data of simulation node.

Further, the multi-point geostatistical prestack inversion method based on a renewal probability ratio constant theory, wherein in sub-step 5.2 when it is not a primary iteration, the suggested data pattern is determined according to both prior geological information of multi-point geostatistics and the joint probability obtained by the cumulative distribution function of the elastic parameter of the logging information.

Further, the multi-point geostatistical prestack inversion method based on a renewal probability ratio constant theory, wherein in step ③ the initial attribute value assigned to the to-be-evaluated point in a work area can be a certain value or can be obtained randomly by Monte Carlo sampling.

Further, the multi-point geostatistical prestack inversion method based on a renewal probability ratio constant theory, wherein in step ① the cumulative distribution function is used as an object of elastic parameter sampling under a constraint of later-period lithofacies.

Further, the multi-point geostatistical prestack inversion method based on a renewal probability ratio constant theory, wherein in step ③ ;

assigning an initial attribute value to a to-be-evaluated point in a work area is obtained through the following three sub-steps:

sub-step 3.1: ordered access of simulation nodes wherein by accessing a simulation node means traversing all grids according to a certain order, the certain order being a principle from bottom to top, from left to right and from front to back; when lithofacies data exist in the grid, an initial attribute value does not need to be assigned; when there is no lithofacies data in the grid, a next step is carried out;

sub-step 3.2: randomly distributing lithofacies according to Monte Carlo sampling;

randomly sampling by adopting the Monte Carlo sampling method according to different lithofacies proportions counted in step ① to distribute lithofacies to a to-be-evaluated grid, at the time the lithofacies only being temporarily stored in the grid and it being possible that it can be removed after elastic parameters are distributed according to the lithofacies in a next sub-step;

sub-step 3.3: randomly distributing elastic parameters corresponding to lithofacies randomly for different lithofacies according to the Monte Carlo sampling;

according to temporary lithofacies data of the grid in sub-step 3.2, and according to the cumulative probability distribution of different elastic parameter data of different lithofacies in step ①, performing Monte Carlo sampling to obtain the density value, longitudinal wave velocity value, and shear wave velocity value of temporary lithofacies of the grid;

after the initial attribute value of a simulation work area is assigned, the known grid of the work area still being the grid through which the drilling passes, and the to-be-evaluated grid still being the grid through which no drilling passes; lithofacies data only being available on a known grid, while elastic parameter data is available on all grids in the work area.

The present disclosure has the following advantages. 1. According to the disclosure, prior information is obtained by utilizing a multi-point geostatistics method, and then screening is carried out through a minimum objective function such that the complexity of seismic inversion is reduced.

2. According to the disclosure, the single completely matched suggested data pattern simulation is obtained by scanning the training image through the data event such that the operation efficiency is greatly improved on the premise of ensuring the accuracy of the inversion result.

3. According to the disclosure, since each renewal is a simultaneous renewal of the sedimentary facies and elastic parameters, the reservoir inversion consistency is well ensured; in addition, because the objective function selected in each internal cycle is the smallest, that is, the synthetic seismic data is closer to the real seismic record, the accuracy of reservoir inversion is effectively improved.

BRIEF DESCRIPTION OF DRAWINGS

FIG. 8 is one data event of the embodiment according to the present disclosure.

FIG. 9 is a suggested data pattern for the embodiment according to the present disclosure.

FIG. 10 is a partial diagram of the pseudo-random number of the embodiment according to the present disclosure.

DETAILED DESCRIPTION OF THE EMBODIMENTS

Figure 1:
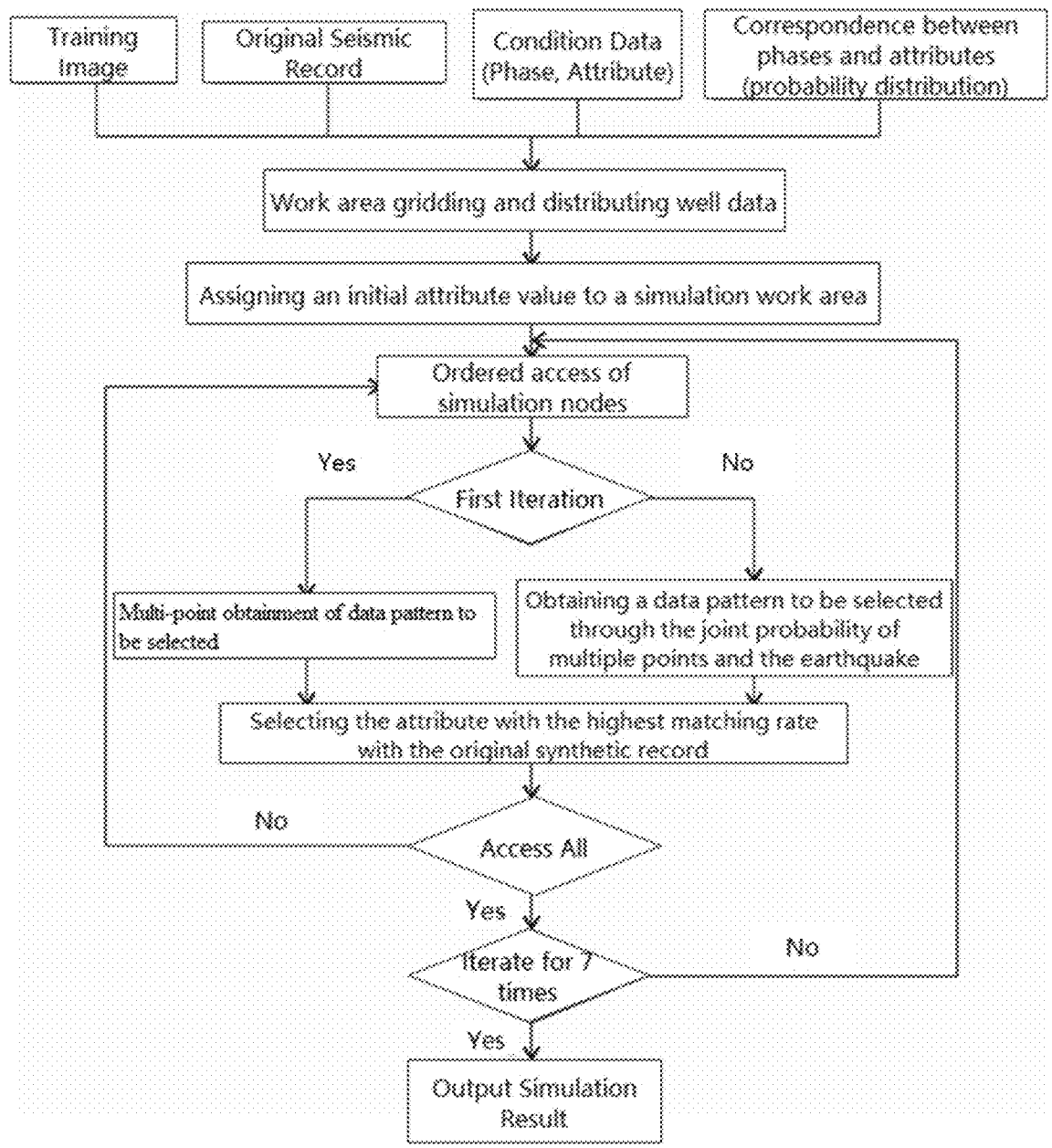
FIG. 1 is a step diagram of the embodiment according to the present disclosure.

The following describes the implementation of the present disclosure in detail with reference to the accompanying drawings, but does not constitute a limitation to the present disclosure, and is merely examples. The present disclosure is described in further detail through and by way of specific implementations.

The multi-point geostatistical prestack inversion method based on the renewal probability ratio constant theory described in the disclosure comprises obtaining a training image of a reservoir structure of a research area through field outcrop, a geological knowledge base, well information and seismic information geological analysis; taking well data as the hard constraint condition, and acquiring lithofacies distribution prior information by using a multi-point modeling method; obtaining seismic attributes of prediction points by Monte Carlo sampling according to the probability density distribution relation between the attributes and the lithofacies; during non-primary iteration, with the stratum model parameter of the prior iteration serving as the constraint condition, using the joint probability for obtaining the probability density distribution of the lithofacies by a multi-point modeling method;

calculating reflection coefficients of each trace according to a Connolly formula, and performing convolution with the actual seismic wavelet to synthesize seismic traces; determining the matching rate of the synthetic record and the actual seismic record by using an objective function; and finally, selecting the stratum model parameter with high matching rate to realize the multi-point geostatistical prestack inversion method based on the renewal probability ratio constant theory.

Referring to FIGS. 1-25: the multi-point geostatistical prestack inversion method based on the renewal probability ratio constant theory comprises the following specific steps.

① Sorting out the information checking whether the original seismic information and well information is complete, with the seismic information being prestack seismic data, and the well information comprising drilling core and logging data; according to well information interpretation result, it being possible that lithofacies corresponding to different well depths and the elastic parameter of different lithofacies can be determined, with the elastic parameter comprising density, longitudinal wave velocity, and shear wave velocity; establishing facies proportions of different lithofacies according to the lithofacies data, and establishing cumulative distribution functions of the elastic parameter of different lithofacies according to the elastic parameter data; and establishing a training image conforming to the reservoir characteristics of a work area.

② Work area gridding and distributing well data selecting an appropriate grid size according to the actual work area range, performing grid division on the work area, and establishing a grid model; gridding core data and logging data according to the plane position and the well depth of each well; and with the core data being lithofacies, the logging data being interpreted density, longitudinal wave velocity, and shear wave velocity;

distributing the core data and the logging data as hard data to the divided nearest neighbor grid node;

the information contained in the actual drilling within a work area being called hard data or condition data, with the hard data comprising lithofacies, density, longitudinal wave data, and shear wave velocity; a grid distributed with the hard data of the lithofacies being called a known grid or a known point; a grid without lithofacies data being called to-be-evaluated grid or also called to-be-evaluated point;

after work area gridding and distributing well data, the distributing well data being drilling data and logging data;

the known grid being a grid distributed with lithofacies data, the known grid being a grid through which drilling passes, and the to-be-evaluated grid being a grid through which no drilling passes; the known grid of the work area containing lithofacies, density, longitudinal wave velocity, and shear wave velocity, and the to-be-evaluated grid not having any data.

③ Assigning an initial attribute value to a simulation work area according to the statistical cumulative distribution function of the rock elastic parameter of the work area, an initial attribute value (referring to elastic parameter) being assigned to a to-be-evaluated point of the work area.

④ Selecting a data template with an appropriate size determining the shape and size of a data template according to the morphological characteristics of the sedimentary facies; it being possible that the shape of the data template can be determined according to the heterogeneity of the sedimentary facies, it being possible that a two-dimensional ellipse or a three-dimensional ellipsoid can be adopted when the heterogeneity is strong, and it being possible that a two-dimensional rectangle or a three-dimensional cuboid can be adopted when the heterogeneity is weak; the size of the data template not being specified in a hard-and-fast manner, and it being possible that a data template size of 5×7 or 5×5×7 can be generally adopted.

⑤ Inversion

The inversion is obtained by the following three sub-steps.

Sub-step 5.1: ordered access of simulation nodes firstly, randomly generating pseudo-random numbers for all grids in a work area with the numerical values of the random numbers being between 0 and 1, and then taking the size of a data template of the to-be-evaluated grid to search the number of condition points around; the numerical value of each to-be-evaluated point being equal to the sum of the pseudo-random number and the number of the condition points, sorting all to-be-evaluated points from large to small, and simulating the grid with a large value in priority to obtain a simulation path of the entire work area.

Sub-step 5.2: suggested data pattern obtainment.

If primary inversion is carried out and a to-be-evaluated grid is processed, firstly the number of condition points, the position relative to the to-be-evaluated point, and the lithofacies type in a data template range with the to-be-evaluated point as the center are determined to form a data event presented in a vector form with the to-be-evaluated point as the center; the data event is utilized to randomly scan a training image established in step ① to obtain a first completely matched data pattern therefrom as a suggested data pattern; the suggested data pattern represents a sedimentary mode, which is a lithofacies data structure with the size of the data template and where the lithofacies data structure of the condition points in the data template can be fully embodied in the suggested data pattern;

if iterative inversion is carried out and a to-be-evaluated grid is processed, firstly, a data event is formed according to a to-be-evaluated point and a condition point of a data template range of the to-be-evaluated point, and a training image established in step ① is scanned randomly through the data event to obtain a plurality of completely matched data patterns from the training images as candidate data patterns; the candidate data patterns are sorted according to the lithofacies type of the central point to make cumulative probability distribution;

the candidate data pattern can contain up to the first 50 data patterns scanned from the first-to-last training images, when less than 50 candidate data patterns, all the data patterns of the training images scanned with the data event are used as candidate data patterns, and the proportion of different lithofacies is calculated according to the difference of the central lithofacies of the candidate data patterns and denoted as $a_{x1}:a_{x2}: \ldots :a_{xm}$ and the probability of elastic parameters of different facies is calculated according to the last elastic parameter according to the following formula:

$$b = \frac{1}{(8\pi^3 \sigma_{\rho_i} \cdot \sigma_{V_{P_i}} \cdot \sigma_{V_{S_i}})^{\frac{n}{2}}} \cdot \exp\left[\sum_{i=1}^{n}\left(\frac{(\rho_i - \mu_\rho)^2}{2\sigma_{\rho_i}^2} + \frac{(V_{P_i} - \mu_{V_P})^2}{2\sigma_{V_{P_i}}^2} + \frac{(V_{S_i} - \mu_{V_S})^2}{2\sigma_{V_{S_i}}^2}\right)\right]$$

in the formula, b represents the probability of the lithofacies elastic parameter, n represents the number of grids in the range of the data template of the to-be-evaluated point, $\rho_i$ represents the density value of the $i^{th}$ grid in the range of the data template surrounding the to-be-evaluated point, $V_{P_i}$ represents the longitudinal wave velocity of the $i^{th}$ grid in the range of the data template surrounding the to-be-evaluated point, $V_{S_i}$ represents the shear wave velocity of the $i^{th}$ grid in the range of the data template surrounding the to-be-evaluated point, $\mu_\rho$ represents the mean value of the lithofacies density, $\mu_{V_p}$ represents the mean value of the lithofacies longitudinal wave velocity, $\mu_{V_s}$ represents the mean value of the lithofacies shear wave velocity, $\sigma_{\rho_i}$ represents the variance of the lithofacies density, $\sigma_{V_{P_i}}$ represents the variance of the lithofacies longitudinal wave velocity, and $\sigma_{V_{S_i}}$ represents the variance of the lithofacies shear wave velocity;

the proportion of elastic parameters of different lithofacies is denoted as: $b_{x1}: b_{x2}: \ldots : b_{xm}$;

finally, a joint probability of different facies is calculated with $(a_{x1} \cdot b_{x1}):(a_{x2} \cdot b_{x2}): \ldots : (a_{xm} \cdot b_{xm})$, and denoted as $P_{x1}: P_{x2}: \ldots : P_{xm}$; the joint probability is normalized to obtain $P'_{x1}:P'_{x2}: \ldots P'_{xm}$, and the joint probability of different lithofacies is made into a cumulative distribution function;

then the candidate data patterns are sorted according to the lithofacies of the central grid, followed by randomly sampling to obtain a random number between 0 and 1, and the suggested data pattern is determined according to the position of a cumulative distribution function formed by the random number in the joint probability and the cumulative probability distribution of the candidate modes.

Sub-step 5.3: suggested elastic parameter obtainment according to the cumulative distribution function of the elastic parameters of different rock facies counted in step ①, sampling the elastic parameters of the rock facies at each position in the suggested data pattern; the elastic parameter comprising a density value, a longitudinal wave velocity value, and a shear wave velocity value;

Sub-step 5.4: a synthetic record of the suggested elastic parameter in the suggested data pattern is calculated The reflection coefficient is calculated based on the following Connolly formula by using the suggested elastic parameter and the preset incident angle;

$$EI(m,\theta) = V_P^{(1+\tan^2\theta)} \cdot V_S^{(-8K\sin^2\theta)} \cdot \rho^{(1-4K\sin^2\theta)}$$

in the formula, $$K = \frac{V_s^2}{V_p^2},$$

EI(m, θ) represents the reflection coefficient when the incident angle is θ, θ represents the preset incident angle, m represents the elastic parameters, comprising $V_p$, $V_s$ and ρ, $V_p$ represents the longitudinal wave velocity, $V_s$ represents the shear wave velocity, and ρ represents density;

based on the reflection coefficient and the seismic ground wave, initial forward modeling is calculated by adopting the following convolution formula:

$$g(m) = w(\theta) * EI(m,\theta)$$

in the formula, g(m) represents initial forward modeling, m represents an elastic parameter, and w(θ) represents a seismic wavelet when the incident angle is θ.

Sub-step 5.5: selecting the elastic parameter with the highest matching rate with the original prestack data The synthetic record of the last elastic parameter and the suggested elastic parameter are calculated respectively by sub-step 5.3 and sub-step 5.4, and the former is denoted as $g(m_l)$, and the latter is denoted as $g(m_s)$; moreover, the original prestack elastic parameter is denoted as $g_o$; herein the last elastic parameter can be an initial elastic parameter or a suggested elastic parameter in the previous iteration process;

a plurality of synthetic seismic traces is compared with the actual seismic record by adopting the following formula, and the stratum model parameter with the minimum objective function and the corresponding suggested data pattern are selected as an optimal inversion result:

$$m = \begin{cases} m_l, & |g(m_l) - g_o| < |g(m_s) - g_o| \\ m_s, & |g(m_l) - g_o| \geq |g(m_s) - g_o| \end{cases}$$

in the formula, m represents the selected elastic parameter, $m_l$ represents the last elastic parameter, and $m_s$ represents the suggested elastic parameter in the suggested data model.

⑥ Judging the iteration termination

Sub-steps 5.1 to 5.5 are repeated until all grids are traversed, that is, simulation at all to-be-evaluated points being completed is that one-time inversion realization is achieved;

when the iterative inversion times are less than 7, step ⑤ is repeated and the next iterative inversion is carried out; when the iterative inversion is completed at the seventh time, the whole inversion process is completed, a multi-point geostatistical seismic inversion model is obtained, and a simulation result is output.

In step ②; when there is multiple well data in one grid, the data point closest to the center of the grid is selected as hard data.

In sub-step 5.1; the order of accessing simulation nodes is usually from rich well information area gradually to less rich well information area, and finally to no well area.

In sub-step 5.2; rock facies condition data includes well condition data and sedimentary facies data of the simulation nodes.

In sub-step 5.2; when it is not the primary iteration, the suggested data pattern is determined according to both the prior geological information of multi-point geostatistics and the joint probability obtained by the cumulative distribution function of the elastic parameter of the logging information.

In step ③; the initial attribute value assigned to the to-be-evaluated point in a work area can be a certain value or can be obtained randomly by Monte Carlo sampling.

In step ①; the cumulative distribution function is used as the object of elastic parameter sampling under the constraint of later-period lithofacies In step ③; assigning an initial attribute value to a to-be-evaluated point in a work area is obtained through the following three sub-steps.

Sub-step 3.1: ordered access of simulation nodes

By accessing a simulation node means traversing all grids according to a certain order, such as a principle from bottom to top or from left to right or from front to back; when lithofacies data exist in the grid, an initial attribute value does not need to be assigned; when there is no lithofacies data in the grid, the next step is carried out;

Sub-step 3.2: randomly distributing lithofacies according to Monte Carlo sampling;

randomly sampling by adopting the Monte Carlo sampling method according to different lithofacies proportions counted in step ① to distribute lithofacies to a to-be-evaluated grid, at the time the lithofacies only being temporarily stored in the grid and it being possible that it can be removed after elastic parameters are distributed according to the lithofacies in the next sub-step;

Sub-step 3.3: randomly distributing elastic parameters corresponding to lithofacies randomly for different lithofacies according to the Monte Carlo sampling;

according to the temporary lithofacies data of the grid in sub-step 3.2, and according to the cumulative probability distribution of different elastic parameter data of different lithofacies in step ①, performing Monte Carlo sampling to obtain the density value, longitudinal wave velocity value, and shear wave velocity value of the temporary lithofacies of the grid;

after the initial attribute value of the simulation work area is assigned, the known grid of the work area still being the grid through which the drilling passes, and the to-be-evaluated grid still being the grid through which no drilling passes; lithofacies data only being available on a known grid, while elastic parameter data is available on all grids in the work area.

The present disclosure also includes the following specific embodiment.

An implementation step diagram of the seismic reservoir inversion method of embodiment is described with reference to FIG. 1, specifically including the following steps.

(1) Sorting out the information

Figure 2:
FIG. 2 a training image of the embodiment according to the present disclosure.
Figure 3:
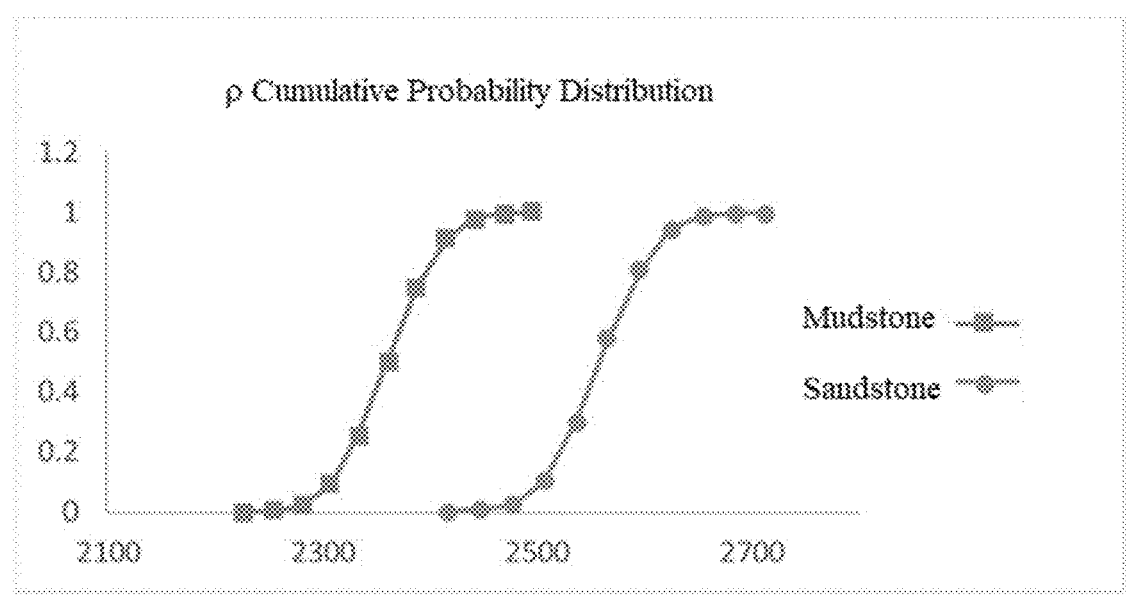
FIG. 3 is a density cumulative distribution diagram for the embodiment the present disclosure.
Figure 4:
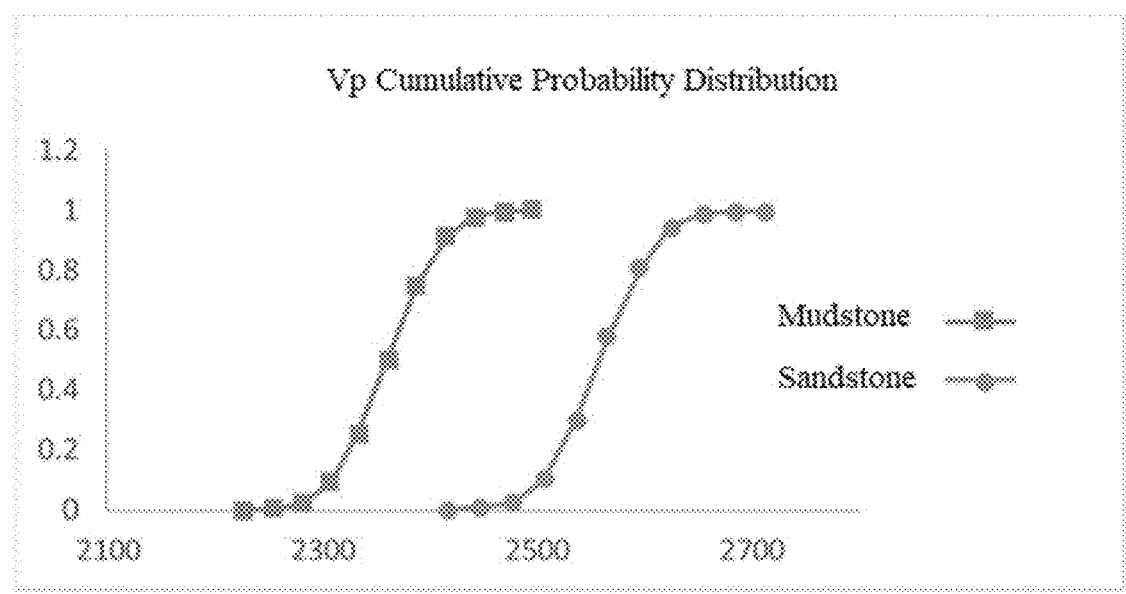
FIG. 4 is a cumulative distribution diagram of longitudinal wave velocity for the embodiment according to the present disclosure.
Figure 5:
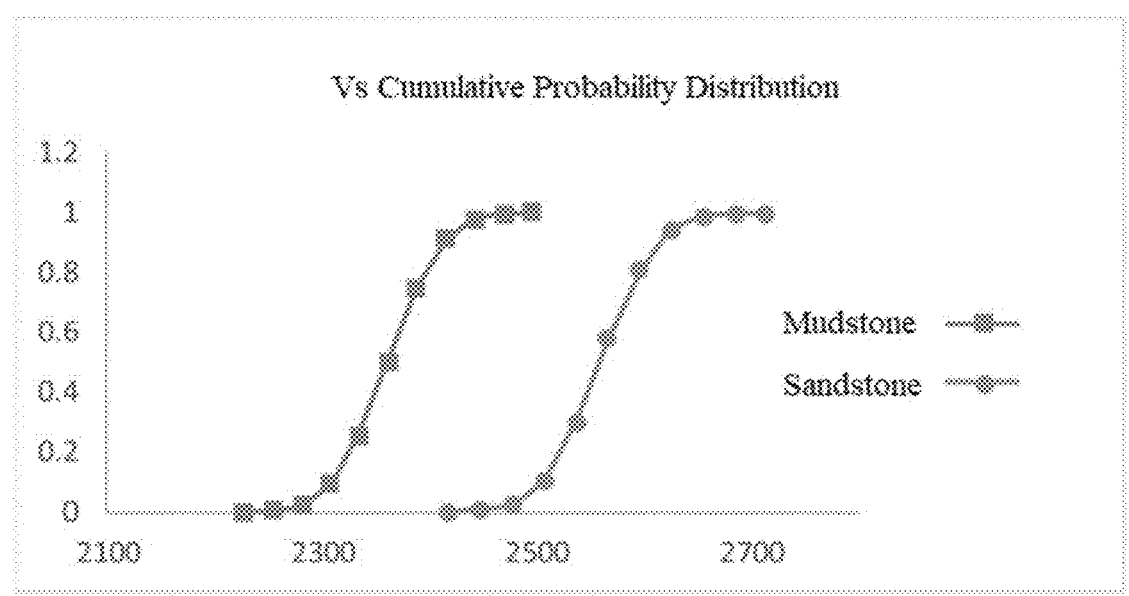
FIG. 5 is a cumulative distribution diagram of shear wave velocity for the embodiment according to the present disclosure.

A training image shown in FIG. 2 is established according to the fluvial facies characteristics of a work area. A cumulative distribution diagram of the elastic parameters of the sand-mudstone rocks in the work area is established. As shown in FIGS. 3, 4 and 5, the mudstone has a density range of 2.17-2.33 g/cm$^3$, a longitudinal wave velocity range of 3930-4272 m/s, and a shear wave velocity range of 2226-2496 m/s; the sandstone has a density range of 2.27-2.42 g/cm$^3$, a longitudinal velocity range of 4041-4528 m/s, and a lateral velocity range of 2300-2561 m/s. The physical property parameters of the sand-mudstone overlap and intersect, and each obeys Gaussian distribution.

(2) Work area gridding and distributing well data

Figure 6:
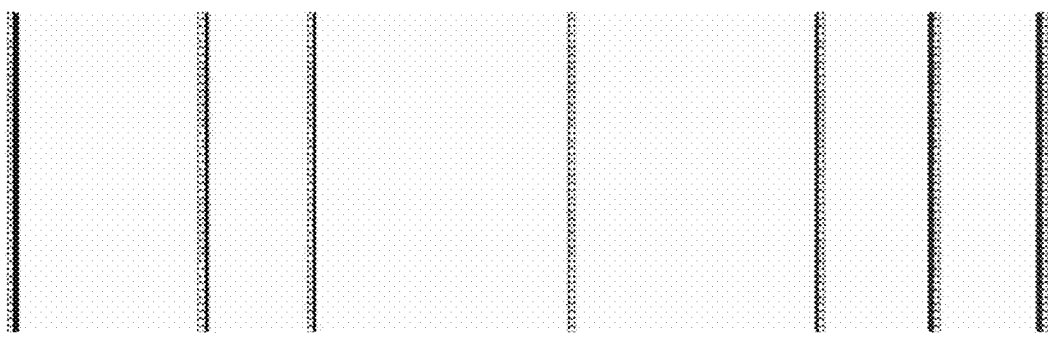
FIG. 6 is well condition data for the embodiment according to the present disclosure.
Figure 7:
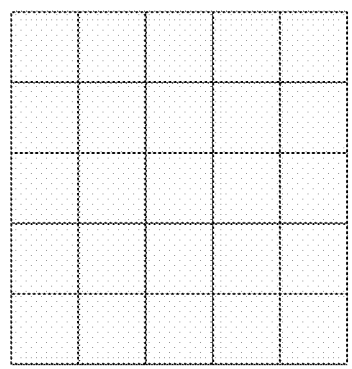
FIG. 7 is a data template of the embodiment according to the present disclosure.
Figure 11:
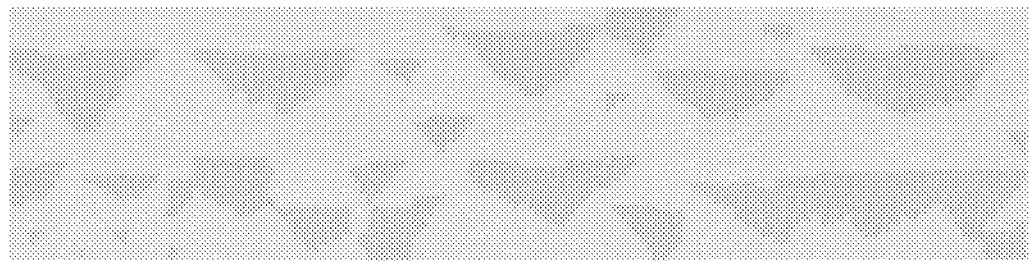
FIG. 11 is a first iterative inversion phase diagram of the embodiment according to the present disclosure.
Figure 12:
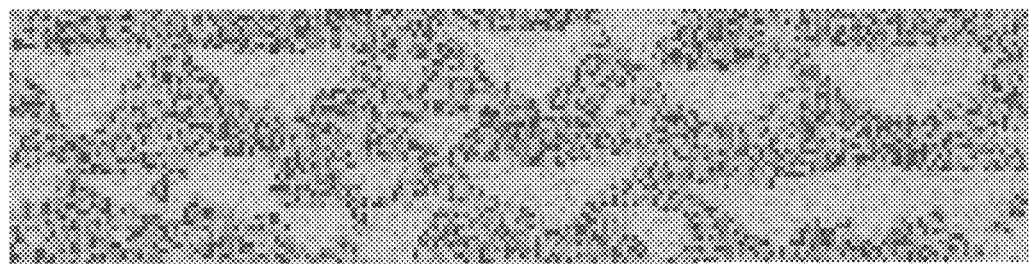
FIG. 12 is a first iterative inversion density diagram of the embodiment according to the present disclosure.
Figure 13:
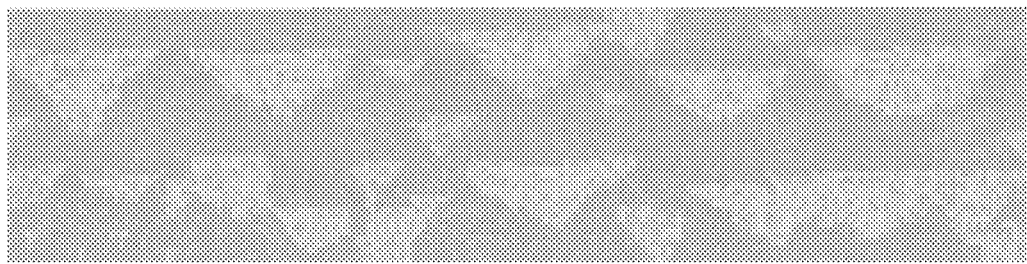
FIG. 13 is a first iterative inversion longitudinal wave velocity diagram for the embodiment according to the present disclosure.
Figure 14:
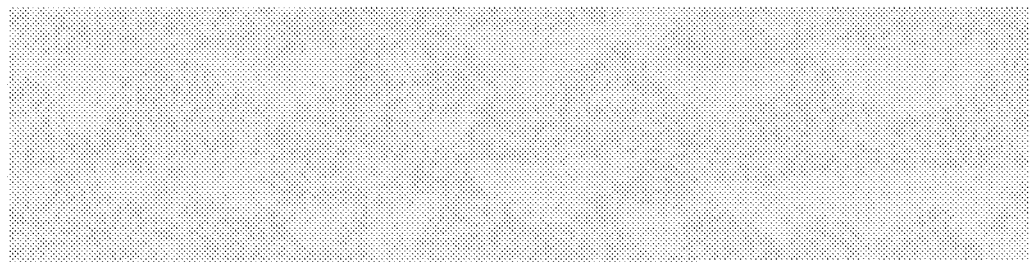
FIG. 14 is a first iterative inversion shear wave velocity diagram for the embodiment according to the present disclosure.
Figure 15:
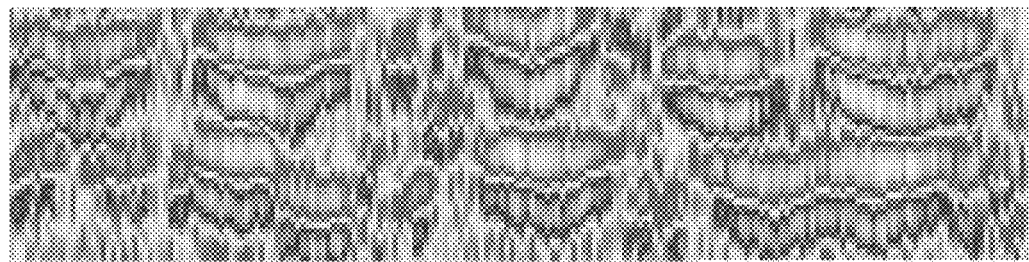
FIG. 15 is a first iterative inversion synthetic seismogram of the embodiment according to the present disclosure.
Figure 16:
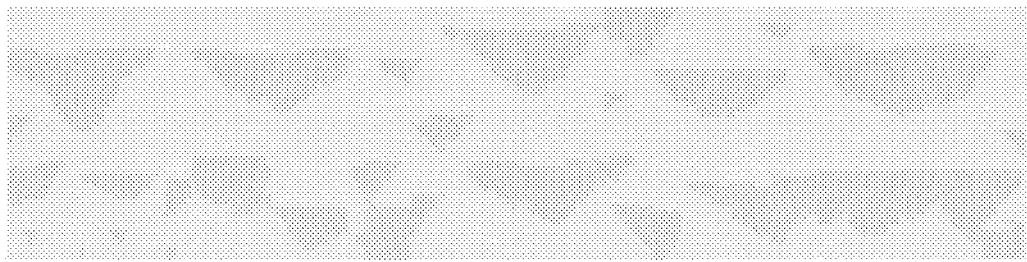
FIG. 16 is a second iterative inversion phase diagram of the embodiment according to the present disclosure.
Figure 17:
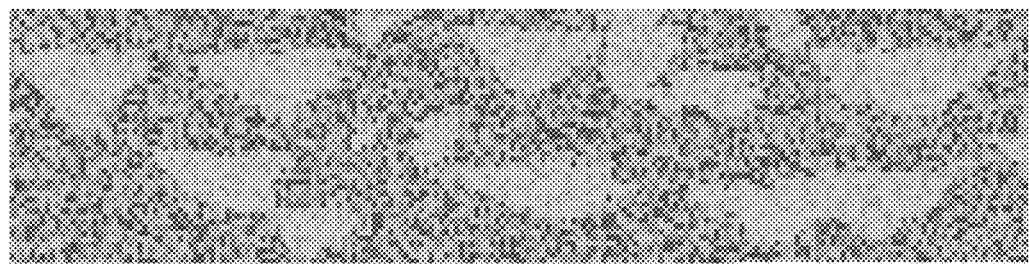
FIG. 17 is a second iterative inversion density diagram of the embodiment according to the present disclosure.
Figure 18:
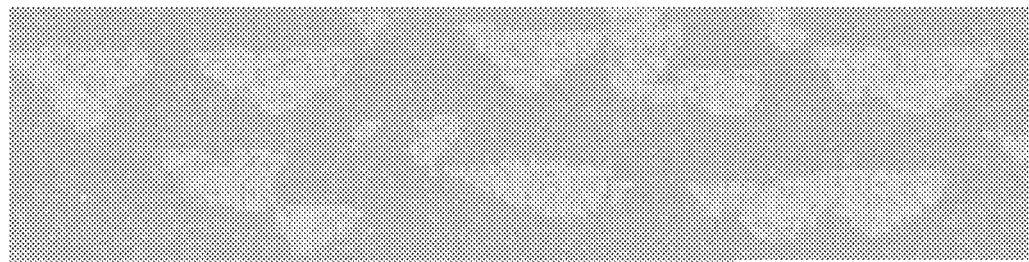
FIG. 18 is a second iterative inversion longitudinal wave velocity diagram for the embodiment according to the present disclosure.
Figure 19:
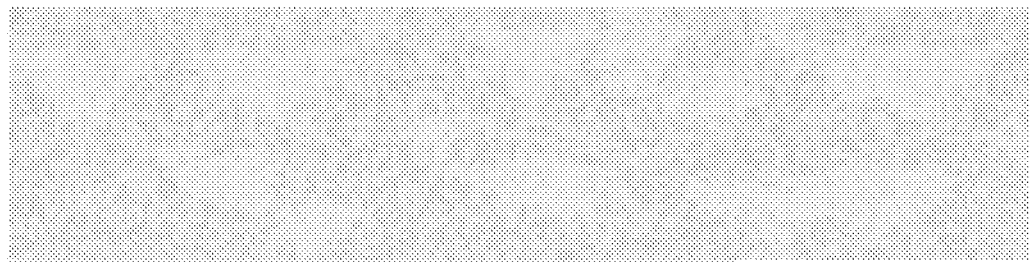
FIG. 19 is a second iterative inversion shear wave velocity diagram for the embodiment according to the present disclosure.
Figure 20:
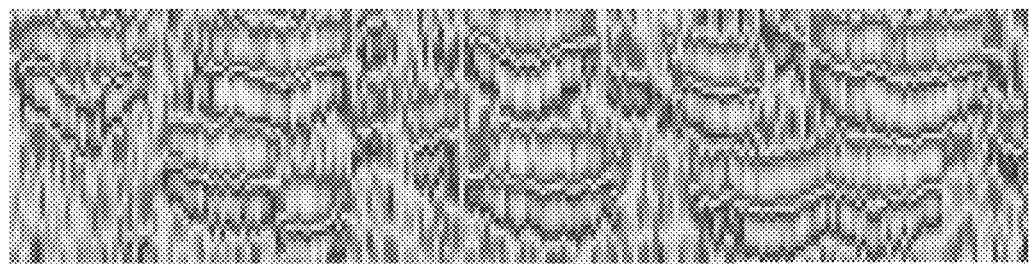
FIG. 20 is a second iterative inversion synthetic seismogram of the embodiment according to the present disclosure.
Figure 21:
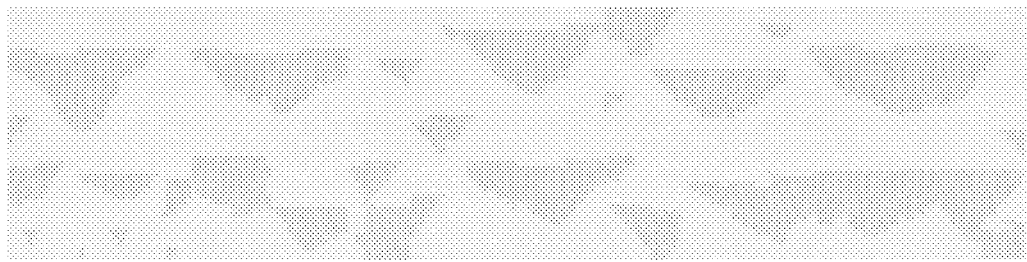
FIG. 21 is a seventh iterative inversion phase diagram of the embodiment according to the present disclosure.
Figure 22:
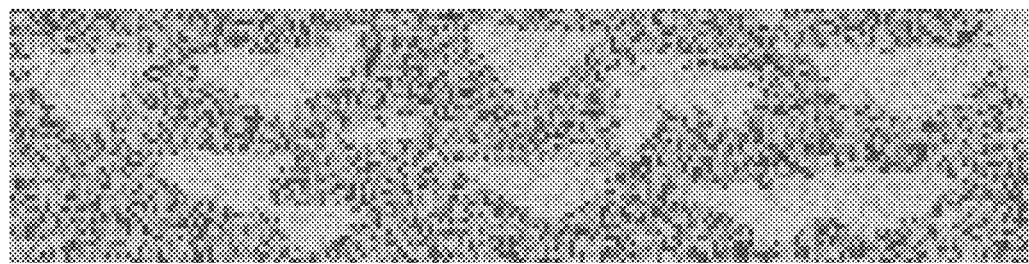
FIG. 22 is a seventh iterative inversion density diagram of the embodiment according to the present disclosure.
Figure 23:
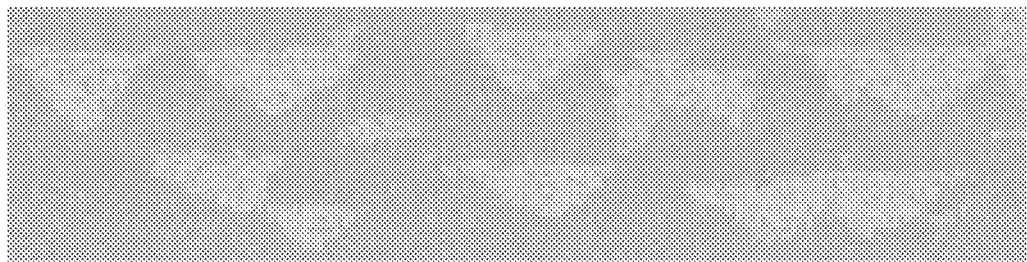
FIG. 23 is a seventh iterative inversion longitudinal wave velocity diagram for the embodiment according to the present disclosure.
Figure 24:
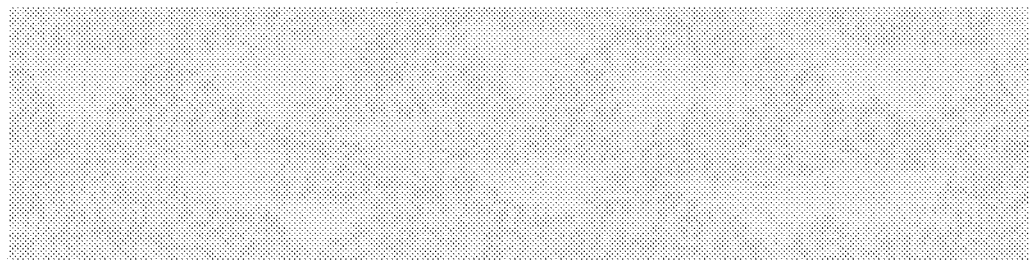
FIG. 24 is a seventh iterative inversion shear wave velocity diagram for the embodiment according to the present disclosure.
Figure 25:
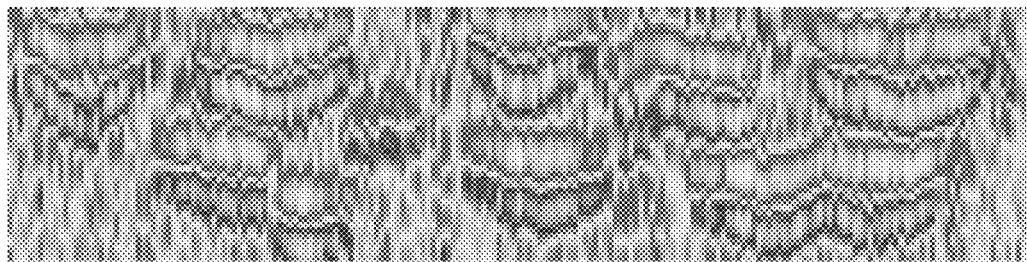
FIG. 25 is a seventh iterative inversion synthetic seismogram of the embodiment according to the present disclosure.

The work area has a total length of 1000 m and a total thickness of 45 m. The model grid is divided into 200×1×45 with each grid having a width of 5 meters and a thickness of 1 m. As shown in FIG. 6, the measured well facies data and rock elastic parameters are distributed into the work area grids.

(3) Assigning an initial attribute value to a simulation work area

An initial attribute value is assigned to a to-be-evaluated point, and the initial value is extracted from the counted probability density distribution by using a Monte Carlo method.

(4) Selecting a data template with an appropriate size

A 5×1×5 data template is selected according to the morphological characteristics of fluvial facies sedimentary facies in the work area.

(5) Determining a pseudo-random path to access the to-be-evaluated grid firstly, randomly generating pseudo-random numbers for all grids in the work area, then searching the number of condition points surrounding the grids in a data template size range, with the sum of the data being the value of a to-be-evaluated point, and sorting it from large to small with the order being a simulation path of the work area; taking the grid points (63, 1, 36) as an example, the first column in the data template range being well data and not participating in the assignment and sorting of random numbers, and the integer of the second and third columns from left to right being 5, indicating that the data template range surrounding each grid contains 5 well data condition points, and similarly, the integer part of the rightmost two columns is 0.

(6) Obtaining data simulation to be selected

Figure 8:
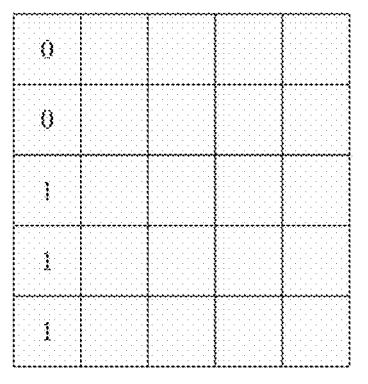
Figure 9:
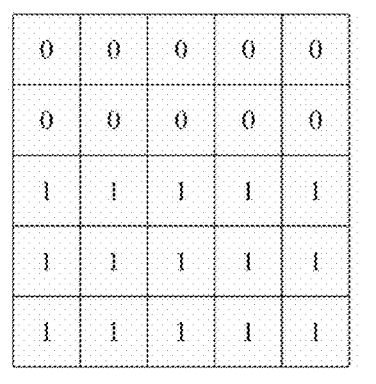

Taking the first grid point (63, 1, 36) as an example, the grid point (63, 1, 36) corresponds to the central point of the data template. The data event shown in FIG. 8 is obtained with the data template and the scan of the training image is started to obtain the first data pattern, i.e. the data pattern is the suggested data pattern (FIG. 9).

(7) Selecting the attribute with the highest matching rate with the original synthetic record A standard ricker wavelet with a dominant frequency of 25 HZ, a total time length of 100 ms, and a sampling rate of 2 ms is selected as the seismic wavelet. The elastic parameter of the lithofacies at different positions of the suggested data pattern is sampled according to the established elastic parameter accumulative distribution diagram of different lithofacies, the reflection coefficient is calculated according to the Connolly formula, and convolution calculation is performed on the reflection coefficient and seismic wavelet to synthesize seismic record. The synthetic seismic record is compared with the original seismic record, an optimal mode is selected, and an attribute corresponding thereto is reserved. After the whole to-be-evaluated grid is assigned a value, the next grid node simulation is switched to until all grid nodes are accessed. FIGS. 9, 10, 11, 12 and 13 are phase diagram, density diagram, longitudinal wave velocity diagram, shear wave velocity diagram, and synthetic seismogram, respectively, of the first iterative inversion.

(8) Reestablishing the pseudo-random path and starting the subsequent iterative inversion. Phase diagram, density diagram, longitudinal wave velocity diagram, shear wave velocity diagram, and synthetic seismogram of the second iterative inversion are shown in FIGS. 14, 15, 16, 17, and 18. Unlike the first iterative inversion, after the first 50 data patterns are extracted as the data patterns, they are sorted according to the relative data patterns of the central point to form a cumulative distribution diagram, such as 15 data patterns whose central grid is mudstone facies and 35 data patterns whose central grid is sandstone facies. Since the grid density value is 2.32, the longitudinal wave velocity value is 4320 and the shear wave velocity value is 2461 after the last iteration, the ratio of the mudstone facies to sandstone facies is 1:1 according to the probability density function calculation of the sand-mudstone, and then the joint probability ratio of the multiple points to the earthquake is 3:7. First, Monte Carlo sampling is carried out to judge whether the central grid is a mudstone facies or a sandstone facies data pattern. If the sampling result is 0.4, the data pattern corresponding to the 20th data pattern with sandstone facies as the center in the cumulative distribution diagram of the data pattern is selected as the suggested data pattern. Finally, the elastic parameter of the lithofacies at different positions of the suggested data pattern is sampled, the reflection coefficient is calculated according to the Connolly formula, and convolution calculation is performed on the reflection coefficient and seismic wavelet to synthesize seismic record. The synthetic seismic record is compared with the original seismic record, an optimal mode is selected, and an attribute corresponding thereto is reserved. All grids are simulated in turn.

(9) When the iteration number reaches the seventh iteration number, the phase diagram, density diagram, longitudinal wave velocity diagram, shear wave velocity diagram, and synthetic seismogram of the seventh iterative inversion are shown in FIGS. 19, 20, 21, 22 and 23. The inversion results are output, and the multi-point geostatistical prestack inversion based on the renewal probability ratio constant theory is completed.

The parts that are not described in detail above are all the prior art.

The foregoing is only a preferred embodiment of the present disclosure, and is not intended to limit the disclosure. Any modification, equivalent replacement, improvement, etc. made within the spirit and principle of the present disclosure should be included in the scope of the embodiment of the disclosure.

What is claimed is:

1. A multi-point geostatistical prestack inversion method based on a renewal probability ratio constant theory, comprising following specific steps:

①  sorting out information including:

checking whether original seismic information and well information is complete, with the original seismic information being prestack seismic data, and the well information comprising drilling core and logging data; according to well information interpretation result, it being possible that lithofacies corresponding to different well depths and elastic parameters of different lithofacies can be determined, with the elastic parameters comprising density, longitudinal wave velocity, and shear wave velocity;

establishing facies proportions of different lithofacies according to lithofacies data, and establishing cumulative distribution functions of elastic parameters of different lithofacies according to elastic parameter data; and establishing a training image conforming to reservoir characteristics of a work area;

②  performing work area gridding and distributing well data comprising:

selecting an appropriate grid size according to an actual work area range;

performing grid division on the work area;

establishing a grid model;

gridding core data and logging data according to a plane position and well depth of each well;

with the core data being lithofacies, interpreting the logging data including density, longitudinal wave velocity, and shear wave velocity; and distributing the core data and the logging data as hard data to a divided nearest neighbor grid node;

wherein:

information contained in actual drilling within a work area being called hard data or condition data, with the hard data comprising lithofacies, density, longitudinal wave data, and shear wave velocity;

a grid distributed with the hard data of the lithofacies being called a known grid or a known point;

a grid without lithofacies data being called to-be-evaluated grid or also called to-be-evaluated point;

after performing work area gridding and distributing well data, the distributing well data being drilling data and logging data;

the known grid being a grid distributed with lithofacies data, the known grid being a grid through which drilling passes, and the to-be-evaluated grid being a grid through which no drilling passes;

the known grid of the work area containing lithofacies, density, longitudinal wave velocity, and shear wave velocity, and the to-be-evaluated grid not having any data;

③ assigning an initial attribute value to a simulation work area according to a statistical cumulative distribution function of a rock elastic parameter of the work area, an initial attribute value being assigned to a to-be-evaluated point of the work area, wherein the initial attribute value refers to elastic parameter;

④ selecting a data template with an appropriate size comprising:
  determining a shape and size of a data template according to morphological characteristics of sedimentary facies; it being possible that the shape of the data template can be determined according to heterogeneity of the sedimentary facies, it being possible that a two-dimensional ellipse or a three-dimensional ellipsoid can be adopted when the heterogeneity is strong, and it being possible that a two-dimensional rectangle or a three-dimensional cuboid can be adopted when the heterogeneity is weak; the size of the data template adopting a size of 5×7 or 5×5×7;

⑤ obtaining inversion
wherein the inversion is obtained by following three sub-steps:
  sub-step 5.1: ordering access of simulation nodes;
  wherein:
    firstly, pseudo-random numbers are randomly generated for all grids in the work area with numerical values of the pseudo-random numbers being between 0 and 1, and then the size of a data template of the to-be-evaluated grid is taken to search a number of condition points around;
    the numerical value of each to-be-evaluated point is equal to a sum of the pseudo-random number and the number of condition points:
    all to-be-evaluated points are sorted from large to small; and
    a grid with a large value is simulated in priority to obtain a simulation path of an entire work area;
  sub-step 5.2: obtaining suggested data pattern;
    if primary inversion is carried out and the to-be-evaluated grid is processed,
      firstly the number of condition points, a position relative to the to-be-evaluated point and a lithofacies type in a data template range with the to-be-evaluated point as a center are determined to form a data event presented in a vector form with the to-be-evaluated point as the center;
      the data event is utilized to randomly scan a training image established in step ① to obtain a first completely matched data pattern therefrom as a suggested data pattern; and
      the suggested data pattern represents a sedimentary mode, which is a lithofacies data structure with the size of the data template and where the lithofacies data structure of the condition points in the data template can be fully embodied in the suggested data pattern;
    if iterative inversion is carried out and the to-be-evaluated grid is processed,
      firstly, the data event is formed according to the to-be-evaluated point and a condition point of a data template range of the to-be-evaluated point,
      and the training image established in step ① is scanned randomly through the data event to obtain a plurality of completely matched data patterns from training images as candidate data patterns;
      the candidate data patterns are sorted according to the lithofacies type of a central point to make cumulative probability distribution;
      the candidate data pattern can contain up to a first 50 data patterns scanned from first-to-last training images, and when less than 50 candidate data patterns, all the data patterns of the training images scanned with the data event are used as candidate data patterns, and proportions of different lithofacies are calculated according to differences of central lithofacies of the candidate data patterns and denoted as $a_{x1}: a_{x2}: \ldots :a_{xm}$ and a probability of elastic parameters of different facies is calculated according to a last elastic parameter according to following formula:

$$b = \frac{1}{(8\pi^3 \sigma_{\rho_i} \cdot \sigma_{V_{P_i}} \cdot \sigma_{V_{S_i}})^{\frac{n}{2}}} \cdot$$

$$\exp\left[\sum_{i=1}^{n}\left(\frac{(\rho_i - \mu_\rho)^2}{2\sigma_{\rho_i}^2} + \frac{(V_{P_i} - \mu_{V_P})^2}{2\sigma_{V_{P_i}}^2} + \frac{(V_{S_i} - \mu_{V_S})^2}{2\sigma_{V_{S_i}}^2}\right)\right]$$

wherein in the formula,
  b represents the probability of the lithofacies elastic parameter,
  n represents a number of grids in a range of the data template of the to-be-evaluated point,
  $\rho_i$ represents a density value of an $i^{th}$ grid in the range of data template surrounding the to-be-evaluated point,
  $V_{P_i}$ represents the longitudinal wave velocity of the $i^{th}$ grid in the range of the data template surrounding the to-be-evaluated point,
  $V_{S_i}$ represents the shear wave velocity of the $i^{th}$ grid in the range of the data template surrounding the to-be-evaluated point,
  $\mu_\rho$ represents a mean value of the lithofacies density,
  $\mu_{V_p}$ represents the mean value of a lithofacies longitudinal wave velocity,
  $\mu_{V_s}$ represents the mean value of the lithofacies shear wave velocity,
  $\sigma_{\rho_i}$ represents a variance of the lithofacies density,
  $\sigma_{V_{P_i}}$ represents the variance of the lithofacies longitudinal wave velocity, and
  $\sigma_{V_{S_i}}$ represents the variance of the lithofacies shear wave velocity;
a proportion of elastic parameters of different lithofacies is denoted as: $b_{x1}: b_{x2}: \ldots : b_{xm}$;
finally, a joint probability of different facies is calculated with $(a_{x1} \cdot b_{x1}):(a_{x2} \cdot b_{x2}): \ldots : (a_{xm} \cdot b_{xm})$, and denoted as $P_{x1}: P_{x2}: \ldots : P_{xm}$;
the joint probability is normalized to obtain $P'_{x1}: P'_{x2}: \ldots : P'_{xm}$, and the joint probability of different lithofacies is made into a cumulative distribution function;

then the candidate data patterns are sorted according to the lithofacies of a central grid, followed by randomly sampling to obtain a random number between 0 and 1, and the suggested data pattern is determined according to a position of a cumulative distribution function formed by the random number in the joint probability and the cumulative probability distribution of candidate modes;

sub-step 5.3: obtaining suggested elastic parameter;

wherein according to the cumulative distribution function of the elastic parameters of different rock facies counted in step ①, the elastic parameters of the rock facies at each position are sampled in the suggested data pattern; the elastic parameter comprises a density value, a longitudinal wave velocity value and a shear wave velocity value;

sub-step 5.4: calculating a synthetic record of a suggested elastic parameter in the suggested data pattern;

wherein:
a reflection coefficient is calculated based on following Connolly formula by using the suggested elastic parameter and a preset incident angle;

$$EI(m,\theta)=V_p^{(1+tan^2\theta)} \cdot V_s^{(-8K \sin^2\theta)} \cdot \rho^{(1-4K \sin^2\theta)}$$

in the Connolly formula, $$K = \frac{V_s^2}{V_p^2},$$

$EI(m, \theta)$ represents the reflection coefficient when the preset incident angle is $\theta$, $\theta$ represents the preset incident angle, m represents the elastic parameters, comprising $V_p$, $V_s$ and $\rho$, $V_p$ represents the longitudinal wave velocity, $V_s$ represents the shear wave velocity, and $\rho$ represents density;

based on the reflection coefficient and seismic ground wave, initial forward modeling is calculated by adopting following convolution formula:

$$g(m)=w(\theta)*EI(m,\theta)$$

in the convolution formula, g(m) represents initial forward modeling, m represents the elastic parameter, and $w(\theta)$ represents a seismic wavelet when the preset incident angle is $\theta$; and sub-step 5.5: selecting the elastic parameter with a highest matching rate with an original prestack data;

wherein:
the synthetic record of a last elastic parameter and the suggested elastic parameter are calculated respectively by sub-step 5.3 and sub-step 5.4, and the last elastic parameter is denoted as $g(m_l)$, and the suggested elastic parameter is denoted as $g(m_s)$;

the original prestack elastic parameter is denoted as $g_o$; herein the last elastic parameter can be an initial elastic parameter or a suggested elastic parameter in a previous iteration process;

a plurality of synthetic seismic traces is compared with an actual seismic record by adopting following seismic comparison formula, and a stratum model parameter with a minimum objective function and corresponding suggested data pattern are selected as an optimal inversion result:

$$m = \begin{cases} m_l, & |g(m_l) - g_o| < |g(m_s) - g_o| \\ m_s, & |g(m_l) - g_o| \geq |g(m_s) - g_o| \end{cases}$$

in the seismic comparison formula, m represents a selected elastic parameter, $m_l$ represents the last elastic parameter, and $m_s$ represents the suggested elastic parameter in the suggested data model; and ⑥ outputting a simulation result after iteration is judged to be terminated herein sub-steps 5.1 to 5.5 being repeated until all grids are traversed, that is, simulation at all to-be-evaluated points being completed is that one-time inversion realization is achieved;

wherein:
when iterative inversion times are less than 7, step ⑤ being repeated and next iterative inversion being carried out; and when the iterative inversion is completed at a seventh time, a whole inversion process being completed, a multi-point geostatistical seismic inversion model being obtained, and a simulation result being output.

2. The multi-point geostatistical prestack inversion method based on a renewal probability ratio constant theory according to claim 1, wherein in step ② when there are multiple well data in one grid, a data point closest to a center of the grid is selected as hard data.

3. The multi-point geostatistical prestack inversion method based on a renewal probability ratio constant theory according to claim 1, wherein in sub-step 5.1 the ordering access of simulation nodes is usually ordered from rich well information area gradually to less rich well information area, and finally to no well area.

4. The multi-point geostatistical prestack inversion method based on a renewal probability ratio constant theory according to claim 3, wherein in sub-step 5.1 the condition points include rock facies condition points and in sub-step 5.2 the obtained data pattern comprises rock facies condition data including well condition data and sedimentary facies data of simulation node.

5. The multi-point geostatistical prestack inversion method based on a renewal probability ratio constant theory according to claim 4, wherein in sub-step 5.2 when it is not a primary iteration, the suggested data pattern is determined according to both prior geological information of multi-point geostatistics and the joint probability obtained by the cumulative distribution function of the elastic parameter of logging information.

6. The multi-point geostatistical prestack inversion method based on a renewal probability ratio constant theory according to claim 4, wherein in step ③ the initial attribute value assigned to the to-be-evaluated point in a work area can be a certain value or can be obtained randomly by Monte Carlo sampling.

7. The multi-point geostatistical prestack inversion method based on a renewal probability ratio constant theory according to claim 1, wherein in step ① the cumulative distribution function is used as an object of elastic parameter sampling under a constraint of later-period lithofacies.

8. The multi-point geostatistical prestack inversion method based on a renewal probability ratio constant theory according to claim 1, wherein in step ③;

assigning an initial attribute value to a to-be-evaluated point in a work area is obtained through following three sub-steps:

sub-step 3.1: ordering access of simulation nodes
wherein by accessing a simulation node means traversing all grids according to a certain order, the certain order being a principle from bottom to top or from left to right or from front to back; when lithofacies data exist in the grid, an initial attribute value does not need to be assigned; when there is no lithofacies data in the grid, a next step is carried out;

sub-step 3.2: randomly distributing lithofacies according to Monte Carlo sampling comprising:
randomly sampling by adopting a Monte Carlo sampling method according to different lithofacies proportions counted in step ① to distribute lithofacies to a to-be-evaluated grid, at a time the lithofacies only being temporarily stored in the grid and it being possible that it can be removed after elastic parameters are distributed according to the lithofacies in a next sub-step; and sub-step 3.3: randomly distributing elastic parameters corresponding to lithofacies randomly for different lithofacies according to the Monte Carlo sampling comprising:
according to temporary lithofacies data of the grid in sub-step 3.2, and according to the cumulative probability distribution of different elastic parameter data of different lithofacies in step ① performing Monte Carlo sampling to obtain the density value, longitudinal wave velocity value, and shear wave velocity value of temporary lithofacies of the grid;

wherein:
after the initial attribute value of a simulation work area is assigned, the known grid of the work area still being the grid through which the drilling passes, and the to-be-evaluated grid still being the grid through which no drilling passes; and lithofacies data only being available on the known grid, while elastic parameter data is available on all grids in the work area.

* * * * *